United States Patent

Cloud, Jr.

[15] 3,640,051

[45] Feb. 8, 1972

[54] TUBE-FORMING PACKAGING MACHINE

[72] Inventor: William S. Cloud, Jr., 730 Greenwood Ave., Wilmette, Ill. 60091

[22] Filed: Apr. 13, 1970

[21] Appl. No.: 27,550

[52] U.S. Cl. .................................53/178, 53/182, 53/202, 53/372, 198/162
[51] Int. Cl. .......................................................B65b 9/06
[58] Field of Search.....................53/178, 180, 182, 372, 373, 53/202; 198/162

[56] References Cited

UNITED STATES PATENTS

| | | | |
|---|---|---|---|
| 3,210,905 | 10/1965 | Gerlach | 53/180 X |
| 2,987,107 | 6/1961 | Sylvester et al. | 53/372 |
| 3,449,889 | 6/1969 | Molitor, Jr. | 53/182 |
| 3,402,524 | 9/1968 | Griner | 53/180 X |
| 2,251,291 | 8/1941 | Reichelt | 198/162 X |
| 3,356,205 | 12/1967 | McLeod | 198/162 |
| 3,508,378 | 4/1970 | Fehr et al. | 53/372 X |

*Primary Examiner*—Theron E. Condon
*Assistant Examiner*—Neil Abrams
*Attorney*—Darbo, Robertson & Vandenburgh

[57] ABSTRACT

A strip of plastic film is formed into a tube with a succession of articles enclosed in the tube. As the tube is sealed and the trim cut from it, the trim is drawn around the roller on which it is cut more than 90° and around a guide roller to move parallel to the tube. Pairs of pulling bars grip the tube and the trim to pull both, and to seal the tubes between the articles therein. Projecting sponge rubber on the bars seizes the trim in a way tending to pull it faster than the tube, yieldably. The gripper bars are secured firmly at the two ends and loosely at an intermediate point so that the bar is controlled even if one of the securing means fails. A rubber band parallel to the bars aids in ejecting the completed and severed packages. Two lines of articles may be packed in one web by forming a tube around the two lines and simultaneously slitting and heat-sealing between the two lines to form two tubes.

7 Claims, 5 Drawing Figures

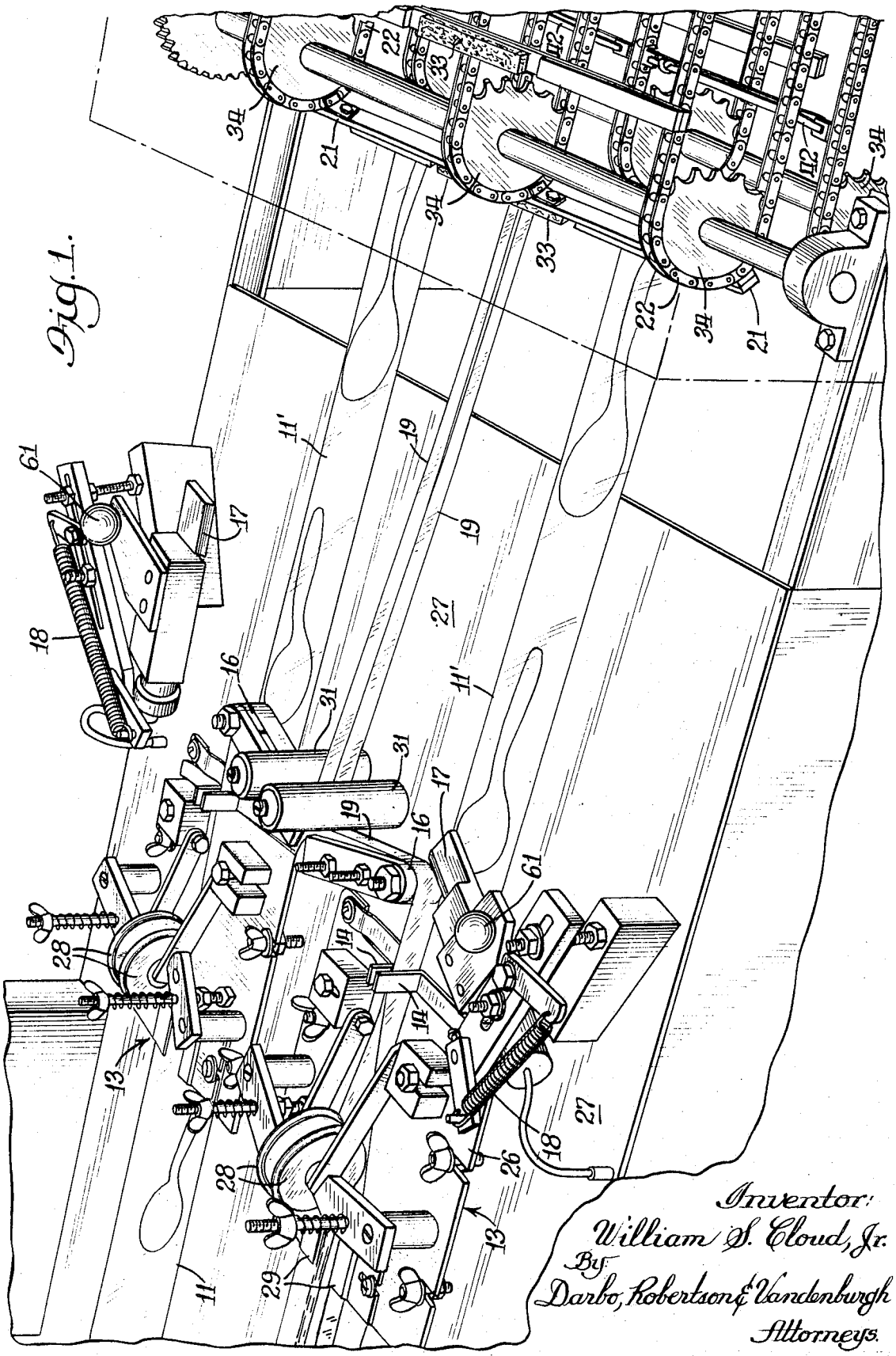

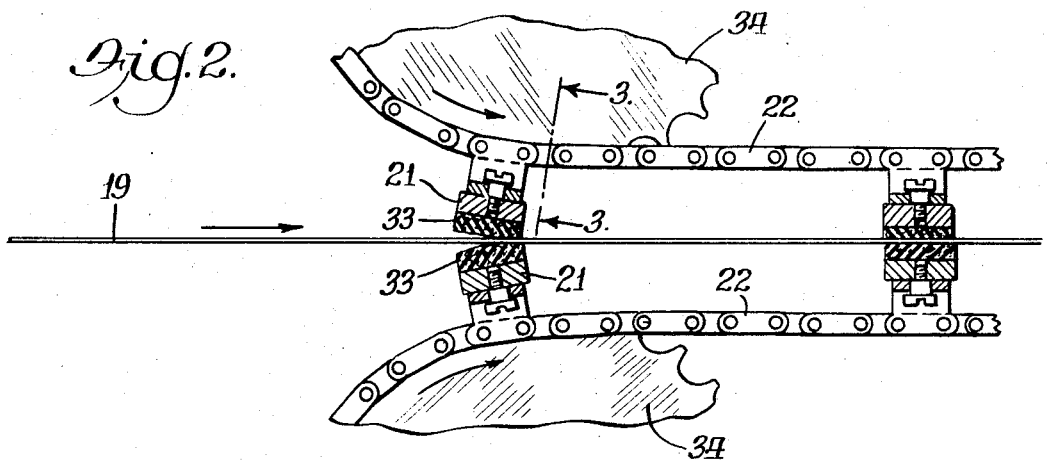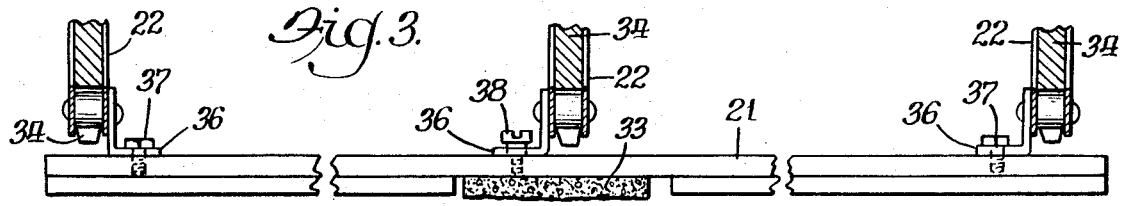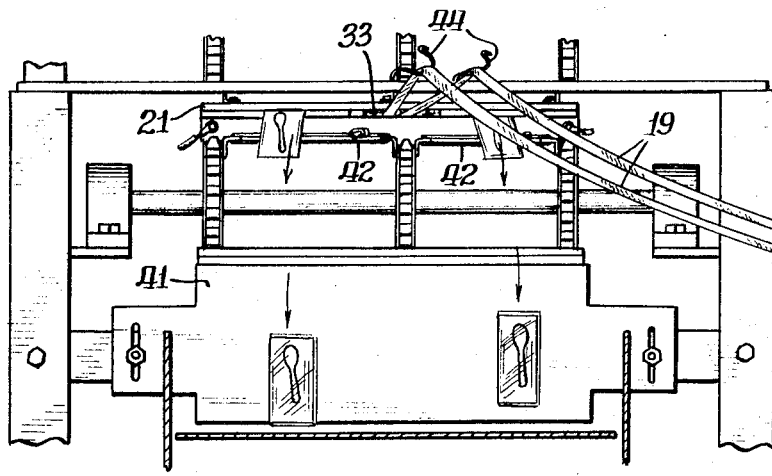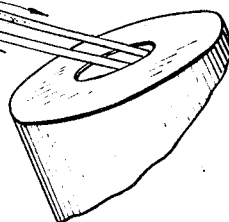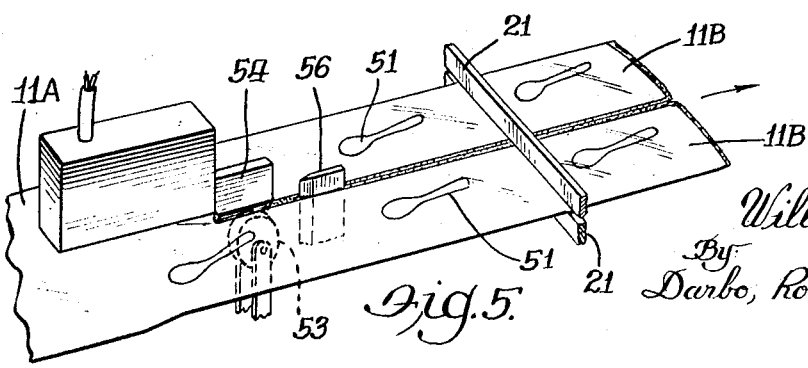

TUBE-FORMING PACKAGING MACHINE

INTRODUCTION

The invention of which this disclosure is offered for public dissemination in the event that patent protection is available relates to a packaging machine of the type in which the articles to be wrapped are laid in succession on an advancing film of plastic material being continuously drawn from a roll and curled to form a tube around the line of articles, a succession of pairs of clamp bars clamping the tube closed between the articles and pulling the tube through the machine, the tube finally being heat-sealed and severed within the clamp. Machines of this type have been in use for some years, but have been quite troublesome, at least in the heat-seal version. In this version, the forming of the tube is not by a broad band of sealing in the overlapped area of the tube, but by bringing the edge portions together edge to edge and heat-sealing at a point spaced from the joint edges by a heat-sealing blade, which cuts or melts through the plastic, simultaneously sealing the tube along a thin, neat line and cutting off the trim. It has been difficult to get this working so uniformly that hour after hour the tube would be properly sealed.

The present invention has been worked out by experimentations made during commercial packaging, starting with custom-built machines which were not deemed ready for marketing. In the continuing experimental project, some of the aspects of the present invention have been in use for over a year in such packaging, but not until recently has a degree of success been achieved which was deemed to make the machines worthy of marketing.

Reliability in the neat type of tube formation, without unduly complex machinery, has been achieved by changes in the drawing of the trim from the cutoff point. As before, the trim is severed as the trim is drawn partly around a backup roll against which the severing blade presses. A key to reliable tube sealing is in changing the drawoff direction so that the trim is drawn around the roll further from the severing point than before. At the same time, maintaining just the right tension on the trim is essential. The angle is corrected by the simple means of changing the position of a guide roller. The tension is achieved with complete reliability and great simplicity by drawing the trim by the same clamp bars that clamp and draw the tube, but with a pad which resiliently tends to draw the trim faster than the same bars draw the tube.

Reliability in the action of the bars is of course important and this has been achieved by carrying each bar on three endless chains, the bar being rigidly secured near its ends to lugs on two of the chains and floatingly secured near its middle to the third chain. Not only is difficulty or breakage due to misalignment avoided, but when failure of a mounting means does occur, as seems to be inevitable, the bar continues to be held in place and to function, so that it can be repaired at the end of the day.

Additional objects and advantages of the invention will be apparent from the following description and from the drawings.

DESIGNATION OF FIGURES

FIG. 1 is a perspective or isometric drawing of the tube-forming and pulling units chosen for illustration.

FIG. 2 is a fragmentary vertical sectional view through the trim-gripping station.

FIG. 3 is a view showing especially the rear face of a gripper bar.

FIG. 4 is a fragmentary view of the discharge end of the machine.

FIG. 5 is a view of a modification of the invention in which a previously formed tube is sealed and severed into two tubes.

INTENT CLAUSE

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

BACKGROUND DESCRIPTION

FIG. 1 illustrates a double machine. Two plastic strips are drawn continuously from rolls out of sight at the left. Each strip 11 is drawn continuously across a loading table, which may be a continuation of table 27 out of sight at the left, and through a tube-forming unit 13 which curls up the edges of the strip, places the edges together in the edge zones face to face, eventually drawing them jointly between guide plates 14 and around a backup roller 16 against which a heated blade 17 is urged by a spring 18. The heated blade 17 simultaneously heat seals the plastic to form the tube 11' and cuts off trim 19. A succession of pairs of bars 21 carried by endless chains 22 grip the tubes between the articles within the tubes and move along with the tube thereby drawing the tubes. Spacing means, not shown, ensure positioning of the articles to correlate with the bars 21. Near the discharge end of the machine a sealing and severing wire within each pair of gripper bars is heated to seal and sever the tube. Separate packages are then discharged as seen in FIG. 4.

Except in connection with the drawoff of the tram 19, the tube-forming units 13 have long been used and are known, and will not be described in detail. For orientation, however, it may be noted that the tube-forming units 13 include baseplates 26 supported above table 27, so that the tube being formed can be drawn, except for its edges, between plate 26 and table 27. Traction rollers 28, which are slightly on a bias, draw the two edges of the advancing plastic strip, in outwardly turned condition, through preliminary guideways 29. Rollers 28 are merely free-running rollers which make the edges of the strip track properly. From under the rollers 28, the edge zones are drawn between the guides 14 previously mentioned and around the backup roller 16.

TRIM DRAWOFF

According to one feature of the present invention, the trim 19 is drawn around a guide roll 31 so positioned that the trim 19 follows the backup roll 16 through more than 90°, or at least 45° past the point of sealing and severing by the blade 17.

From the roller 31 the trim 19 passes to the gripper bars. It will be observed that with the double machine shown in FIG. 1, the two guide-rollers 31 are close together so that the two trims 19 move side by side from that point on.

The gripping and pulling of the trims 19 is seen in FIG. 2. In the area of the trim 19, the guide bars 21 are provided with foam rubber pads 33, which are of a sufficient thickness to seize the trim 19 in the bite between the two pads well before the pads reach the position of being centered in the common axial plane of the sprockets 34 around which the chains 22 carry the gripper bars 21. In other words, when the pads 33 initially grip the trim 19, the gripping occurs on a larger radius from the axis of sprockets 34 than does the gripping of the tubes 11'. The larger radius means that the gripping points of the pads 33 are at this moment moving faster than the movement of the tubes 11'. As a result, they try to move the trim 19 faster than the tube 11' is moving. However, because of their resilient nature they yield resiliently with moderate ease, and this moderate ease determines the tension applied to the trim 19. Previously, a complex separate mechanism was used for the purpose of applying this correct tension to the trim 19.

MOUNTING OF GRIPPER BARS

The illustrated mounting of the gripper bars 21 has greatly reduced shutdowns. Each gripper bar is carried by three chains 22, each of which is provided with an out-turned mounting lug 36 on appropriate links. Screws 37 pass through the two lugs 36 on the chains 22 near the ends of the bar 21, having a snug fit with these lugs and being screwed down to clamp the lugs 36 firmly to the bar. Screw 38, however, through lug 36 on the center chain 22, is a shoulder screw loosely fitting the hole through lug 36. Its shoulder seats upon bar 21 before the head of the screw seats upon lug 36. Accordingly lug 36 is only floatingly secured to bar 21.

There are two advantages of this mounting. Inasmuch as the two screws 37 necessarily determine a straight line, there is no difficulty in inserting the screws 38 due to the fact that the lug 36 might be slightly misaligned with this straight line. The more important advantage, however, is that whenever there is failure at one of the three securing points, there are still two securing points to keep the gripper bar 21 moving properly. This avoids further damage, and instead of having to shut down immediately for repair, the repair can be deferred to a lunch hour or the end of the day.

EJECTION BANDS

Another improvement of the present machine is seen in FIG. 4. There has been difficulty in achieving reliable ejection of the finished packages. When, having been cut from the tube, they are released by separation of the gripper bars, they have not reliably fallen to the proper face of the discharge plate 41. This has been solved by the very simple expedient of stringing rubber bands 42 at intermediate positions between the gripper bars 21. These bands support the package until its leading end is well out beyond the point at which it is over the discharge plate 41, and more or less carry the whole package to the point where, when freed by the separation of the gripper bars 21, it will drop onto the ejection plate 41.

It may also be seen in FIG. 4 that the trims 19, when released by the gripper bars, move through guide hooks 44 to a collection point. A convenient method of collection is to have them enter a container through an aperture, with a blast of air constantly drawing the strip into the container.

TWO TUBES FROM ONE

Although the double machine of FIG. 1 is a very productive machine, this productivity can be doubled with very little additional initial expense. By using a wider strip of plastic 11 and making a larger tube, two lines of articles 51 may be placed on the plastic strip, and the tube initially formed around both of them without disturbing their positioning. Then this single tube, 11A in FIG. 5, can be heat-sealed and severed to form two tubes, 11B. It is merely necessary to provide a backup roll 53 under the initially finished tube and a sealing and severing blade 54 pressing against the backup roll 53 just as the blades 17 press against the backup rollers 16. If the initial tube is formed as illustrated, the cut is preferably along a line spaced from the first seam, but the first tube may be formed in any other way. Complete separation of the two tubes 11B may be ensured by a separator plate 56. If found necessary, this separator 56 may be quite thick so as to produce a pulling apart of the two tubes 11B at the sealing and severing point between blade 54 and backup roller 53.

THREADING

No new difficulty in threading the plastic strip through the machine to start the packaging process has been caused by the present invention. The leading end of each strip is of course hand fed initially through the guides 29, under the rollers 28, through the guides 14, and past the backup rollers 16. As will be observed at the top of FIG. 1, the blade 17 may be swung by handle 61 to an inactive and out-of-the-way position, being held there by spring 18 which passes over center in the course of swinging blade 17 out of the way. Of course, after the strip or web being fed has been drawn to the point of backup roller 16, the blade 17 will be swung into place, severing trim 19 from tube 11', these two being fed separately. Trim 19 if fed around guide roller 31 and then to the pulling mechanism, and the tube is fed directly to the pulling mechanism. Once each has been seized between a pair of bars 21, the movement of the chains 22 sill continue to draw it. The only additional feeding required is as the leading ends of the trims 19 reach the discharge end of the machine to guide them through hook-guides 44 and into the gather-in container.

ACHIEVEMENT

Through cooperation of the improved trim drawoff and the improved gripper-bar mounting, a very reliable tube-forming machine has been provided. Trouble has further been reduced by the improved package ejector comprising rubber bands 42.

I claim:

1. A tube-forming apparatus for use in a machine for packaging products in heat-sealable plastic, including means for curling over and drawing together in outwardly projecting position the edge zones of a flat advancing web, a backup roller having its axis generally perpendicular to the advancing direction and along which he projecting edge zones are drawn; a heated sealing and slitting member pressing through the edge zones against the roller to form a tube by sealing the edge areas continuously together, simultaneously severing trim from the tube; a guide roller around which the trim passes, said guide roller being positioned with respect to the backup roller to draw the trim around that roller for more than a 90° turn, joint pull mechanism for the tube and the trim comprising pairs of tube-pull clamp bars for cooperating in clamping the tube and pulling it, each bar being carried by endless means causing it to follow an arcuate path bringing the two bars together to form a bite to draw the tube; and resilient means carried by the same endless means and following generally a similar arcuate path, but having trim engagement surfaces spaced further from the bars than the axes of the arcuate paths to form a trim-engaging bite relatively upstream as compared to the tube-drawing bite, providing a resilient tendency to pull the trim slightly faster than the tubes are pulled.

2. A tube-forming apparatus for use in a machine for packaging products in heat-sealable plastic, including means for curling over and drawing together in outwardly projecting position the edge zones of a flat advancing web, a backup roller having its axis generally perpendicular to the advancing direction and along which the projecting edge zones are drawn; a heated sealing and slitting member pressing through the edge zones against the roller to form a tube by sealing the edge areas continuously together, simultaneously severing trim from the tube; a guide roller around which the trim passes, said guide roller being positioned with respect to the backup roller to draw the trim around that roller for more than a 90° turn, and means for jointly pulling the tube and trim comprising pairs of gripper bars extending crosswise of the tubes, each bar being carried by three endless chains, one near each end and one intermediate of the ends, all chains having securing lugs extending from certain links thereof, the bars being substantially rigidly secured to the lugs of the chains adjacent the ends of the bar, and being floatingly secured to the flanges of the intermediate chains, whereby exact alignment of the three securing points is unnecessary, but control of the bars is provided even in the event of failure at one of the three securing points.

3. A tube-forming apparatus for use in a machine for packaging products in heat-sealable plastic, including means for curling over and drawing together in outwardly projecting position the edge zones of a flat advancing web, a backup roller having its axis generally perpendicular to the advancing direction and along which the projecting face edge zones are drawn, a heated sealing and slitting member pressing through the edge areas against the roller to form a tube by sealing the edge areas continuously together, simultaneously severing trim from the tube, a guide roller around which he trim passes, said guide roller being positioned with respect to the backup roller to draw the trim away from the tube; and joint-pull mechanism for the tube and the trim comprising pairs of tube-pull clamp bars for cooperating in clamping the tube and pulling it, each bar being carried by endless means, causing it to follow an arcuate path bringing the two bars together to form a bite to draw the tube, and trim engaging means carried by the same endless means and following generally a similar arcuate path, but having trim engagement surfaces of which at least one is spaced further than the bars from axes of the arcuate paths to form a trim-engaging bite relatively upstream as compared to the tube-drawing bite, at least one of said trim engaging means being resilient, providing a resilient tendency to pull the trim slightly faster than the tubes are pulled.

4. A tube-forming apparatus for use in a machine for packaging products in heat-sealable plastic, including means for curling over and drawing together in outwardly projecting position the edge zones of a flat advancing web, a backup roller having its axis generally perpendicular to the advancing direction and along which the projecting edge zones are drawn; a heated sealing and slitting member pressing through the edge zones against the roller to form a tube by sealing the edge areas continuously together, simultaneously severing trim from the tube; a guide roller around which the trim passes, said guide roller being positioned with respect to the backup roller to draw the trim around that roller for more than a 90° turn, means yieldably tending to draw the trim around the guide roller faster than the tube moves.

5. A tube-forming apparatus for use in a machine for packaging products in heat-sealable plastic, including means for curling over and drawing together in outwardly projecting position the edge zones of a flat advancing web, and means for sealing the edge zones, as they advance to form a tube; and means for pulling the tube comprising pairs of gripper bars extending crosswise of the tubes, each bar being carried by three endless chains, one near each end and one intermediate of the ends, all chains having securing lugs extending from certain links thereof, the bars being substantially rigidly secured to the lugs of the chains adjacent the ends of the bar, and being floatingly secured to the flanges of the intermediate chains, whereby exact alignment of the three securing points is unnecessary, but control of the bars is provided even in the event of failure at one of the three securing points.

6. A tube-forming apparatus for use in a machine for packaging products in heat-sealable plastic, including means for curling over and drawing together in outwardly projecting position the edge zones of a flat advancing web, a backup roller having its axis generally perpendicular to the advancing direction and along which the projecting edge zones are drawn; a heated sealing and slitting member pressing through the edge zones against the roller to form a tube continuously elongate in the direction of movement by sealing the edge areas continuously together, simultaneously severing trim from the tube; a guide roller around which the trim passes, said guide roller being positioned with respect to the backup roller to draw the trim around that roller for more than a 90° turn, means yieldably tending to draw the trim around the guide roller faster than the tube moves;

and means for slitting the tube and sealing both halves thereof to form two sealed tubes continuously elongate in the direction of movement.

7. Apparatus for forming two heat-sealed tubes comprising means for curling an advancing sheet of plastic to tube shape with edge portions extending together outwardly from the tube, a backup member along which the edge portions pass and a heated member pressing through the edge portions toward the backup member for simultaneously sealing the tube longitudinally as to the tube and its movement and cutting off the edge portions as trim, and a backup member along which an intermediate portion of the tube passes and which along a chosen line longitudinally of tube and movement presses one face of the tube against the opposite face, and a heated member pressing through the tube toward the backup member for simultaneously slitting the tube to form two tubes and sealing both of said tubes.

* * * * *